United States Patent [19]

Bardos

[11] 4,256,362
[45] Mar. 17, 1981

[54] PHASE-INSENSITIVE HOLOGRAM READOUT TECHNIQUE

[75] Inventor: Andrew M. Bardos, Palm Bay, Fla.

[73] Assignee: Harris Corporation, Cleveland, Ohio

[21] Appl. No.: 873,833

[22] Filed: Jan. 31, 1978

[51] Int. Cl.³ .............................................. G03H 1/22
[52] U.S. Cl. ..................... 350/3.86; 350/3.6
[58] Field of Search ................... 350/3.79, 3.78, 3.75, 350/3.85, 3.86, 3.6; 356/347, 348; 365/125, 216

[56] References Cited

U.S. PATENT DOCUMENTS

| | | | |
|---|---|---|---|
| 3,658,403 | 4/1972 | Greenaway et al. | 350/3.86 |
| 3,698,010 | 10/1972 | Lee | 350/3.86 |
| 3,767,285 | 10/1973 | Mezrich | 350/3.86 |
| 3,832,698 | 8/1974 | Ishii | 350/3.78 |
| 3,860,346 | 1/1975 | Kersch et al. | 356/348 |

*Primary Examiner*—Ronald J. Stern
*Attorney, Agent, or Firm*—Craig & Antonelli

[57] ABSTRACT

A hologram-containing storage medium is rapidly scanned or swept by a sinusoidal spatial fringe pattern, the spatial frequency of which varies with time. This may be achieved by the use of a suitable light beam deflection system and frequency shift arrangement disposed up-stream of a focussing lens. The deflection system and frequency shift arrangement may incorporate a pair of light beams, such as those obtained from a laser, a source of coherent monochromatic light. A single deflector-frequency shifter, such as an acousto-optic element and an electro-mechanical deflector may be disposed in the path of one of the beams, with a prescribed carrier modulation frequency applied to shift the frequency of that one beam relative to that of the other beams. The modulated beam is deflected and is then directed along with the unmodulated beam through the focussing lens so that the beams combine with each other to form a read-out interference pattern on the hologram. Alternatively, a respective frequency shifter, such as an acousto-optic modulator may be disposed in the path of each of the pair of beams and a separate modulation frequency signal applied to each modulator. The frequency difference between the two signal sources represents the temporal frequency carrier component of the interference pattern. The beams are also deflected relative to one another and the light which is then diffracted by the hologram impinges upon a single photo-detector, whereby a signal representative of the original data, together with the imparted modulation components, is derived. The temporal and spatial modulation components introduced in the signal beam by the frequency-shift, deflection system are then removed, to obtain only the original data.

In accordance with the invention, a constant scan frequency may be used or the frequency shift of a light beam may be caused to vary with time (e.g. $\omega(t)=kt$) so as to effectively create a travelling optical chirp. In each case, the interference pattern created on the hologram for reading out the data will contain a translating sinusoidal fringe system with a time varying spatial frequency, and the output of the photo-detector represents the integral of the product of hologram transmissivity and the illumination intensity pattern, which may then be demodulated to obtain the original data.

51 Claims, 8 Drawing Figures

PHASE-INSENSITIVE HOLOGRAM READOUT TECHNIQUE

FIELD OF THE INVENTION

The present invention is directed to a technique of reconstructing or reading-out information which has been recorded in the form of a hologram. The invention is especially directed to the reconstruction of information from a hologram in which signal noise is substantially reduced by reading out the data stored in the hologram in a manner which is considerably phase-insensitive.

BACKGROUND OF THE INVENTION

One desirable present-day hologram recording technique is the Fourier transform hologram recording process wherein an object light beam is directed upon an object or data source, the hologram of which is to be recorded, and then the Fourier-transform of the light waves emanating from the object or data source is focused by a lens onto a hologram storage medium such as a photographic film. This focussed beam is combined with the light from a reference beam, also directed onto the film, to create a Fourier-transform hologram of the data. Data storage and retrieval techniques also frequently make use of one-dimensional records, wherein each Fourier-transform hologram is recorded substantially in the form of a line extending across the storage medium. Reconstruction or read-out of the recorded hologram may proceed by directing a reconstructing beam of light upon the previously recorded hologram-containing film and selectively focussing light diffracted through the film onto a viewing medium or photo conversion medium, such as an opto-electronic read-out system. Normally, the diffracted light of interest is the first order diffracted beam which corresponds to the signal or data band, higher order beams being neglected. Non-diffracted light is contained within the zero order beam.

Unfortunately, there are a considerable number of factors which adversely influence the reconstruction of the original data from the hologram. In addition to degradation imparted by phase, scaling and detector positioning errors, scattering by large phase defects adds ten times more noise to the signal in some types of films at low spatial frequencies than would otherwise be expected from only film grain contributions.

Physical handling of the film may also affect the data. For example, if the film becomes scratched, some of the information is lost due to the removal of the photo-sensitive chemical medium, such as silver halide. Moreover, scratches also affect the amount of light scattered from the zeroth order to the data or signal band. Also, while fingerprints disturb the phase uniformity of the film base in a way that adds no significant scattering or zero order to signal band noise, they do contribute signal band to signal band data crosstalk due to defocussing and other aberrations of all data bits. Film thickness non-uniformities are usually slow-varying so that only the first order effect (wedge effect) which produces a displacement of the Fourier transform (signal band shift) is significant.

Scaling errors of the signal band, generated by the film's dimensional instability, as caused by aging or due to temperature and humidity fluctuations, can usually be corrected by simple mechanical adjustment (zoom lens). Still, the strict positioning requirement of the read-out detector array (opto-electronic array) may be a very difficult problem in reconstruction systems that are subjected to vibration or a wide range of the above-described environmental conditions.

SUMMARY OF THE INVENTION

In accordance with the present invention, the above-mentioned problems which adversely influence data reconstruction performance in conventional systems are substantially reduced by effecting both a temporal and spatial modulation of the read-out or reconstruction light as it is directed upon the hologram containing recording medium.

Specifically, the hologram-containing storage medium is rapidly scanned or swept by a sinusoidal spatial fringe pattern, the spatial frequency of which varies with time. This may be achieved by the use of a suitable light beam deflection system and frequency shift arrangement disposed up-stream of a focussing lens. The deflection system and frequency shift arrangement may incorporate a pair of light beams, such as those obtained from a laser, a source of coherent monochromatic light. A single deflector-frequency shifter, such as an acousto-optic element and an electro-mechanical deflector may be disposed in the path of one of the beams, with a prescribed carrier modulation frequency applied to shift the frequency of that one beam relative to that of the other beams. The modulated beam is deflected and is then directed along with the unmodulated beam through the focussing lens so that the beams combine with each other to form a read-out interference pattern on the hologram. Alternatively, a respective frequency shifter, such as an acousto-optic modulator may be disposed in the path of each of the pair of beams and a separate modulation frequency signal applied to each modulator. The frequency difference between the two signal sources represents the temporal frequency carrier component of the interference pattern. The beams are also deflected relative to one another and the light which is then diffracted by the hologram impinges upon a single photo-detector, whereby a signal representative of the original data, together with the imparted modulation components, is derived. The temporal and spatial modulation components introduced in the signal beam by the frequency-shift, deflection system are then removed, to obtain only the original data.

In accordance with the invention, a constant scan frequency may be used or the frequency shift of a light beam may be caused to vary with time (e.g. $\omega(t)=kt$) so as to effectively create a travelling optical chirp. In each case, the interference pattern created on the hologram for reading out the data will contain a translating sinusoidal fringe system with a time varying spatial frequency, and the output of the photo-detector represents the integral of the product of hologram transmissivity and the illumination intensity pattern, which may then be demodulated to obtain the original data.

DETAILED DESCRIPTION

Figure 1:
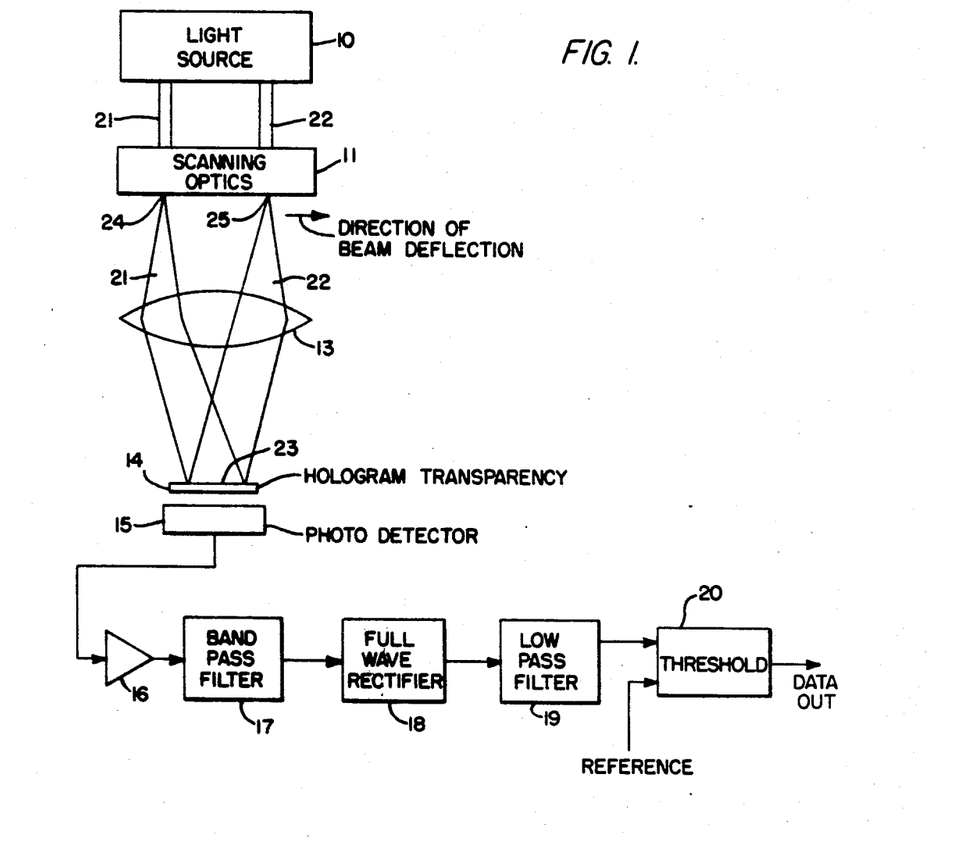
FIG. 1 is a general block diagram illustrating a phase-insensitive hologram read-out system.

Referring now to FIG. 1 of the drawings, wherein a first embodiment of the present invention is illustrated, there are shown a suitable light source 10, which may include a laser together with an appropriate beam splitter, which generates a pair of beams 21 and 22 to be used for reading-out the data stored in a hologram transparency 14. For purposes of the description to follow, it will be assumed that the data contained in hologram transparency 14 is digital data recorded on the linear portion of the $T_I$ versus E curve of the film, and the Fourier interference pattern of hologram transparency 14 containing N bits of digital data is substantially one-dimensional, extending from left to right as shown in FIG. 1.

Beams 21 and 22 impinge upon scanning optics 11, which reduces the cross-section of each beam from the generally circular shape emitted by the laser to thin line-shaped cross-sections to correspond to the general one-dimensional configuration of the hologram contained in transparency 14. A suitable cylindrical lens arrangement may be provided for this purpose. Scanning optics 11 further converges beams 21 and 22 to point sources 24 and 25 which are deflected positionally relative to one another. For this purpose, scanning optics 11 may include a conventional acousto-optics deflector inserted in either or both of the paths of beams 24 and 25, together with a focussing lens disposed so as to form beams 21 and 22 into points 24 and 25 and positionally displace point sources 24 and 25 relative to each other. Of course, other deflection devices such as mechanical deflectors or electro-optic deflection arrangements may be used to impart the translational movement of point sources 24 and 25 of beams 21 and 22 relative to each other. In addition to being deflected relative to one another, beams 21 and 22 are of respectively different frequencies. Where beams 21 and 22 emanate from the same laser source, one of the beams may be frequency-shifted by passing that one beam through a frequency shifting device such as a suitable acousto-optic element. By driving the acousto-optic element at some prescribed input frequency $\omega_D$, the beam passing therethrough will be frequency-shifted by the Doppler effect by an amount corresponding to this prescribed input frequency $\omega_D$. Thus, assuming that each of beams 21 and 22 was originally obtained from the same laser source emitting an output light beam at a frequency $\omega_O$, then, if one of the beams, such as beam 21, is passed through a frequency shifting device such as the above-referred to acousto-optic element to which an input frequency $\omega_D$ is applied, beam 21 will be shifted in frequency relative to beam 22 by that amount, i.e. $\omega_D$. Alternatively, a respective frequency shifting device may be inserted in the path of each of beams 21 and 22, so that the frequency of each of beams 21 and 22 is shifted by an amount to establish a frequency difference between the beams. Thus, a first acousto-optic element may be inserted in the path of beam 21 and be imparted with an input frequency $\omega_1$, while a second acousto-optic element may be positioned in the path of beam 22 and be imparted with an input frequency $\omega_2$. Input frequencies $\omega_1$ and $\omega_2$ are such that $|\omega_1-\omega_2|=\omega_D$, thereby effectively creating a frequency difference between beams 21 and 22. This frequency difference $\omega_D$ is the carrier frequency component of the fringe system produced on hologram transparency 14.

Figure 7:
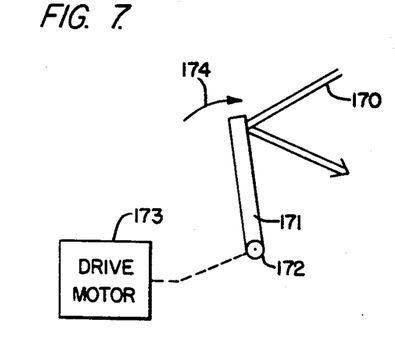
FIG. 7 illustrates an electro-mechanical deflector-frequency shift device.

Rather than employ separate elements for effecting deflection and frequency shift of a light beam, scanning optics 11 may incorporate suitable devices which both deflect and frequency shift the beam. FIG. 7 illustrates an electro-mechanical arrangement for this purpose. A mirror 171 is driven in rotation about axis 172 by a suitable rotational drive motor 173. Impinging upon an outer edge portion of mirror 171 is beam 170 to be both deflected and frequency shifted. As mirror 171 is rotated in the direction of arrow 174 (clockwise as viewed in FIG. 7), reflected beam 170 is deflected in a generally downward direction. At the same time, because of the movement of mirror 171 toward incident beam 170, the reflected beam is translated in frequency resulting from the well known Doppler shift phenomenon.

As another expedient for effecting both deflection and frequency shift of an incident beam, scanning optics may incorporate a suitable acousto-optic modulator inserted in the path of one or both of beams 21 and 22 and supplied with a time varying input frequency. In response to a time varying input frequency, the acousto-optic modulator will cause the beam incident thereon to be both angularly deflected and to undergo a frequency shift which varies with that of the varying input frequency. A detailed description of the configuration and operation of such a driven acousto-optic modulator will be presented below in connection with the embodiments of the invention associated with FIGS. 3 through 6 and 8.

For either type of frequency shift and deflection, scanning optics 11 may further include a suitable focussing lens to convert the angular displacement of either or both of beams 21 and 22 into positionally displaced point sources 24 and 25.

Now, disposed downstream of scanning optics 11 is a Fourier transform lens 13 which converts the relative positional displacement of point sources 24 and 25 into relative angular displacement of the direction of impingement of beams 21 and 22 upon hologram transparency 14. Lens 13 is positioned so that point sources 24 and 25 and transparency 14 are located in respective focal planes of lens 13. Upon hologram transparency 14, beams 21 and 22 combine to form a Fourier-transform interference pattern 23. Due to the positional deflection of beam 22 relative to beam 21, and the difference in frequency of beams 21 and 22, there is formed an interference pattern 23 on transparency 14 having an illumination intensity comprised of a rapidly translating sinusoidal fringe system with a slowly time varying spatial frequency. Namely, at any location x and at any instant in time t along the one-dimensional hologram-containing transparency 14, beams 21 and 22 will have combined to create a hologram read-out illumination intensity I (x,t).

In order to obtain a translating sinusoidal fringe system and a time varying spatial frequency, I (x,t) may be of the form:

$$I(x, t) = 1 + \cos(axt + bx + ct) \quad (1)$$

in the region of the hologram, wherein $-L/2 \leq x \leq L/2$, and zero (0) for $|x| > L/2$. Therefore, from equation (1), one may obtain the spatial frequency (cycles/mm)

$$k(t) = (at + b)/2\pi \quad (2)$$

and a temporal frequency (radians/sec.)

$$\omega(x) = ax + c \quad (3)$$

The light transmitted through hologram 14 is integrated over the entirety of the hologram (from $-L/2$ to $+L/2$) by a photo-detector 15 which is positioned immediately behind transparency 14. At the output of photo-detector 15 there is obtained a signal $$s(t) = \int_{-\infty}^{\infty} h(x) I(x, t) \, dx \quad (4)$$

where $h(x)$ is the intensity transmissivity of hologram 14.

In equation (1) above, the coefficients a, b, and c may be defined as follows:

(1) $c$ = the carrier frequency in $s(t)$. Let c equal the difference frequency $$|\omega_{21} - \omega_{22}| = \omega_D; \quad (5)$$

(2) b can be chosen such that $K_0$ is detected at $t=0$, $$\text{so } b = 2\pi K_0; \text{ and} \quad (6)$$

(3) a can be chosen so that the last data bit $K_1$ is detected at $t_1$, therefore $$a = 2\pi \left( \frac{K_1 - K_0}{t_1} \right) \quad (7)$$

Using the above-decided upon parameters for a, b, and c, then the read-out beam illumination intensity I (x,t), from equation (1) becomes $$I(x, t) = 1 + \cos\left[ 2\pi \left( K_0 + \frac{K_1 - K_0}{t_1} t \right) x + \omega_D t \right] \quad (8)$$

Where each of beams 21 and 22 is coherent, the read-out intensity I (x,t) becomes $$I(x, t) = \tfrac{1}{2} [\exp(2\pi i \vec{k} \cdot \vec{r}) + \exp(2\pi i \vec{k}' \cdot \vec{r} + i\omega_D t)]^2 \quad (9)$$

$$= 1 + \cos(2\pi (k_x - k_x') x + \omega_D t) \quad (10)$$

where $y = z = 0$, and $$k_x - k'_x = K_0 = t(K_1 - K_0)/t_1 \quad (11)$$

Figure 2:
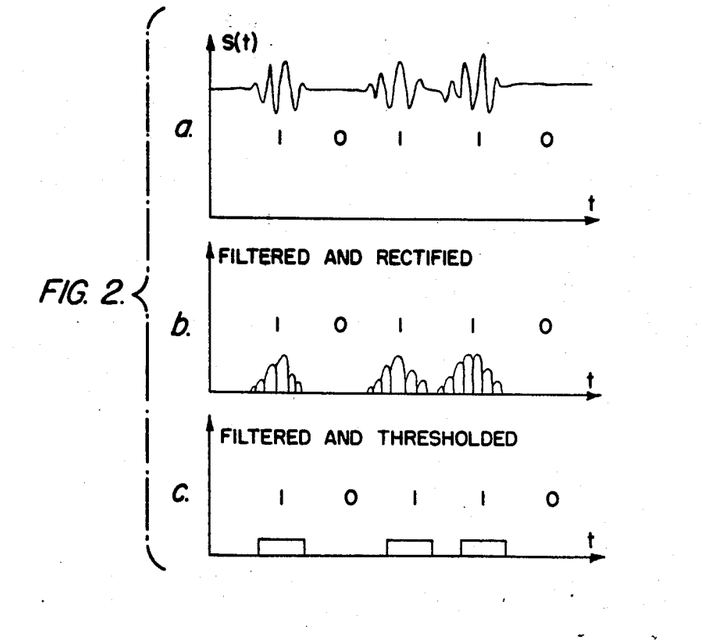
FIGS. 2a through 2c are signal diagrams useful in explaining the operation of the system shown in FIG. 1.

Demodulation of the output $s(t)$ of photo-detector 15 is necessary to recover the data contained within the hologram transparency 14. To this end, after being amplified by amplifier 16, the signal, as representative of digital data, may generally be of the form shown in FIG. 2a.

The recovered D.C. bias component may be removed by an appropriate filter 17, after which the signal s(t) is subjected to full wave rectification by rectifier 18 to obtain a signal as shown in FIG. 2b.

The envelope of signal s(t) is then detected by low pass filter 19 and the resultant signal is compared in threshold circuit 20 with a threshold reference for establishing the binary states of the data bits. If the envelope exceeds the threshold, the state of the bit is a logic ONE, and if the envelope fails to exceed the threshold, the state of the bit is determined to be a logic ZERO, as shown in FIG. 2c.

In the foregoing embodiment wherein the photo-detector output takes on the form shown in FIG. 2a, a pair of beams 21 and 22 were deflected relative to one another and one or both of the beams was deflected, with the frequency difference $\omega_D$ between the beams being maintained at a prescribed or constant value. As a result of this constant frequency approach, the general form of the hologram readout illumination intensity takes the form defined by equation (1). However, as was mentioned previously, the frequency of at least one of the pair of beams used to form the illumination intensity interference pattern may vary with time. In each of the embodiments of the invention to be described below, the frequency of at least one of the beams is caused to vary with time so that the read-out beam intensity I (x,t), created on transparency 14, may be defined as $$I(x,t) = 1 + \cos[(a(x-ct)+b)(x-ct)] \quad (12)$$

Thus, the signal s(t) detected by photo-detector 15 will represent the correlation of the hologram transmissivity and an optical chirp (i.e. $\omega(t) = kt$). The spatial frequency K (x,t) is defined as $$K(x,t) = (b - 2act + 2ax)/2\pi \quad (13)$$

By choosing the parameters so that the 2ax term in equation (13) can be neglected for $|x| \leq L/2$, then there is obtained a single spatial frequency overlying the hologram with a time varying spatial frequency and a temporal frequency.

Therefore, $$k(t) = b - 2act/2\pi \text{(cycles/mm) and} \quad (14)$$

$$\omega(t) = 2ac^2 t - bc \text{(rad/sec.)} \quad (15)$$

at $(x=0)$.

From equations (14) and (15) it can be seen that $$\omega(t) = -ck(t).$$

Figure 3:
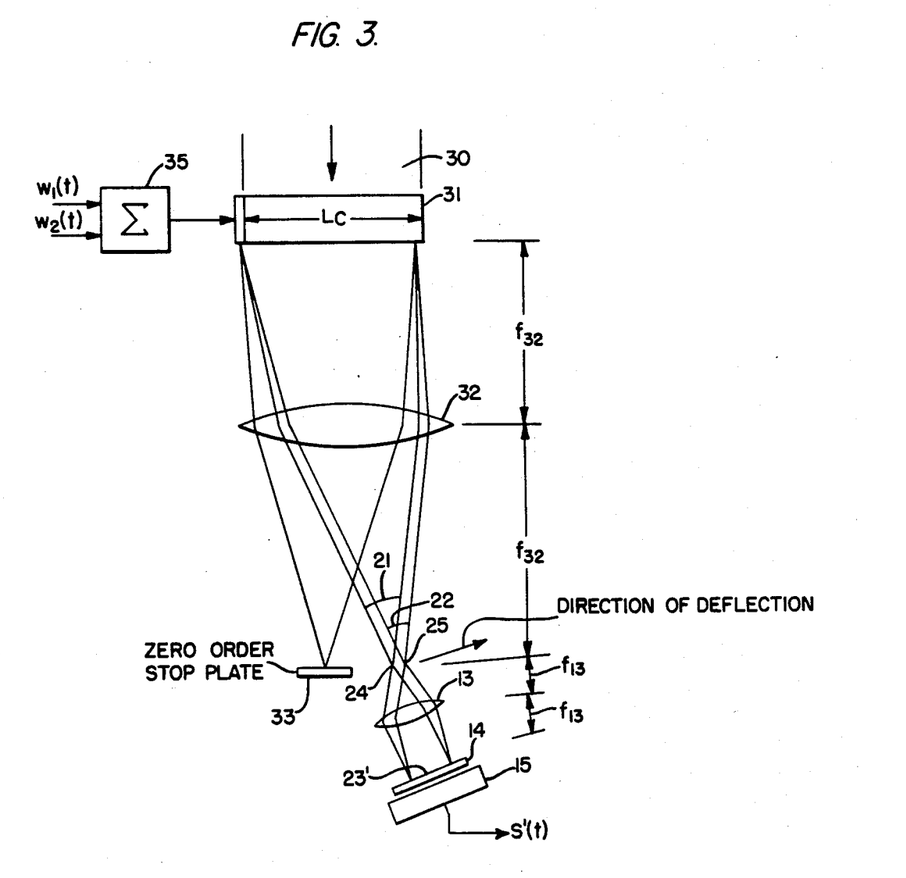
FIG. 3 is a block diagram of an embodiment of a phase-insensitive hologram read-out system employing chirp modulation.

To create a read-out beam illumination intensity I (x,t) as defined in equation (12), the configuration shown in FIG. 3 may be used. An input beam 30 from a suitable light source, such as a laser, and of a substantially one-dimensional or line-shaped cross-section, impinges upon a suitable deflector such as an acousto-optic cell 31. The length $L_c$ of acousto-optic cell 31 is sufficient to accomodate as many cycles of the chirp to be created by frequencies $\omega_1(t)$ and $\omega_2(t)$ as established by the highest spatial frequency bit in the hologram contained in transparency 14. Signal $\omega_1(t)$ may be of constant frequency, while frequency $\omega_2(t)$ may increase with time such that $\omega_2(t) = \omega_1 + \omega_0(t)$, where $\omega_0$ is the frequency difference between $\omega_1(t)$ and $\omega_2(t)$ at time $t=0$. These frequencies are applied to adder 35 wherein they are combined to produce an acousto-optic cell scanning signal.

In response to this scanning signal, acousto-optic cell 31 produces, in addition to a zero order beam corresponding to the non-diffracted component, a pair of angularly deflected beams 21 and 22 which are converted into positionally deflected beams by lens 32. The zero order component is removed by a suitable stop plate 33. Lens 32 focusses beams 21 and 22 at points 24 and 25, which points are displaced positionally relative to one another by an increasing lateral translation with the passage of time, due to the increasing frequency of $\omega_2(t)$. Fourier transform lens 13 converts the positional shift of beams 21 and 22 into an angular impingement shift on hologram transparency 14, forming interference pattern 23'. Acousto-optic cell 31 is located at a focal plane of lens 32 opposite to the focal positions containing point sources 24 and 25 of beams 21 and 22, respectively, while each of points 24 and 25 is located in a focal plane of lens 13 opposite that containing hologram transparency 14. Therefore, lenses 32 and 13 perform a complementary Fourier transform action, whereby an image of the acoustic wave pattern contained in cell 31 is established as the read-out intensity pattern 23' on transparency 14. Photocell 15 generates a chirp-containing output signal s'(t) which may then be demodulated by appropriate filtering, rectification, and threshold circuitry as in the case of the preceding embodiment. However, to improve processing, conventional chirp demodulation circuitry, as commonly used in chirp radar systems, may be inserted at the output of amplifier 16, shown in FIG. 2, to remove the time varying frequency component from the carrier, thereby permitting improved filtering of the signal.

Figure 4:
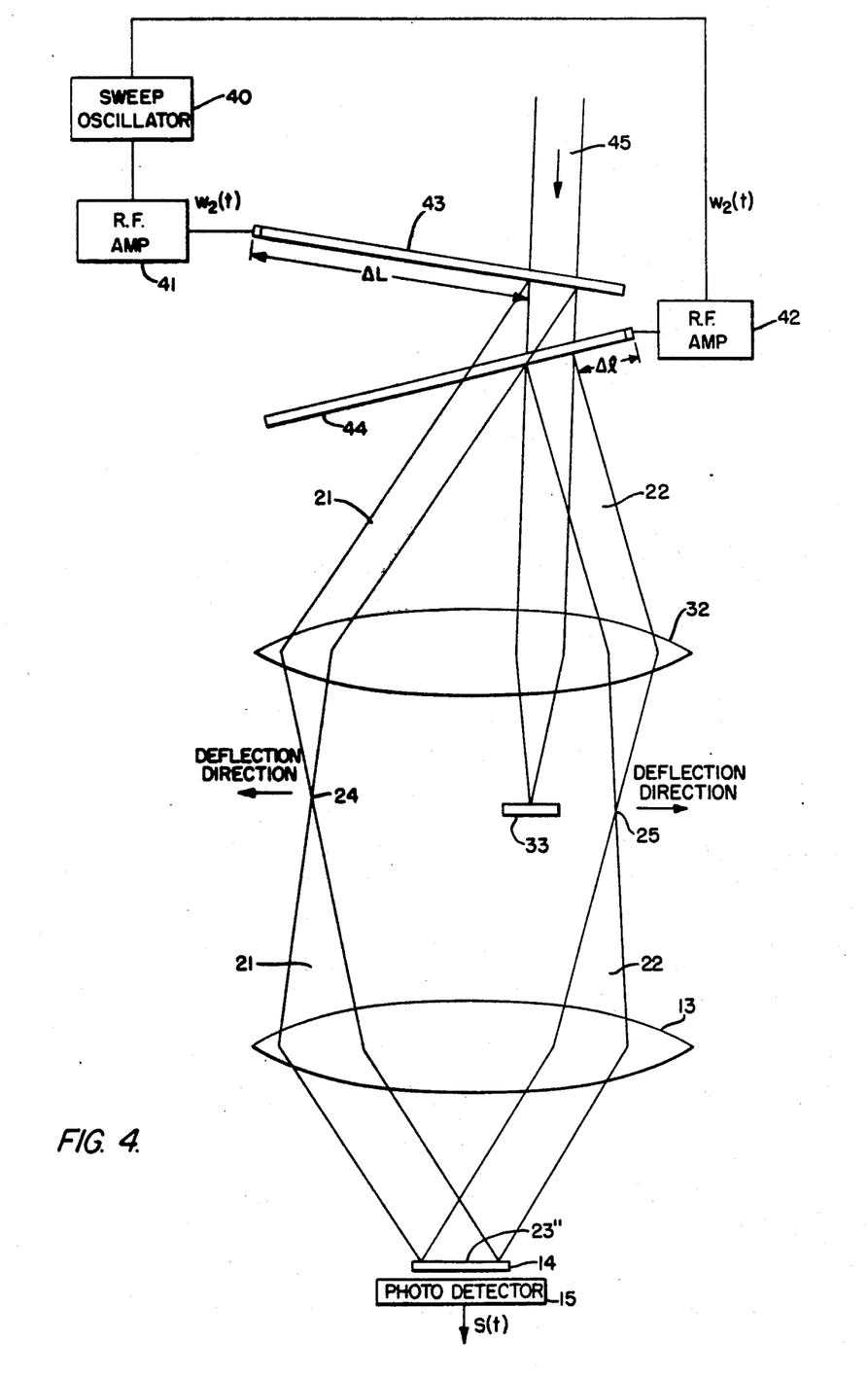
FIG. 4 is a diagram of an embodiment of a phase-insensitive hologram read-out system employing delay chirp scanning.

Rather than employ a pair of input frequencies $\omega_1(t)$ and $\omega_2(t)$, described above, to produce an optical travelling chirp, the scanning optics driving source may be simplified to use only a single input frequency which changes with time. FIG. 4 depicts a suitable configuration for obtaining an optical chirp, wherein the same chirp driving signal $\omega_2(t)$ is applied to a pair of acousto-optic cells, each of which deflects an impinging read-out beam, but due to the lengths of the cells and their positions relative to the beam being deflected, the driving frequency for one cell is delayed relative to the other.

The configuration of FIG. 4 contains a sweep oscillator 40 which produces an output $\omega_2(t)$, the frequency of which may increase linearly with time. A pair of R.F. amplifiers 41 and 42 supply this swept oscillator signal to respective acousto-optic cells 43 and 44, so that acoustic waves, the frequency of each of which increases with time, will travel through the cells. Cells 43 and 44 are located in the path of a source readout beam 45 and are appropriately inclined relative to one another to provide separated, angularly deflected beams 21 and 22 which are converted into positionally deflected point sources 24 and 25 by lens 32. In accordance with the present embodiment, a delay chirp signal is created by positioning cells 43 and 44 relative to incident beam 45 so that the point of input of swept frequency signal $\omega_2(t)$ for one cell, relative to the location of incidence of beam 45, is closer than for the other cell, thereby creating an acoustic delay due to the differential wave travel distances in the separate cells. Namely, the physical distance $\Delta L$ through cell 43 from the point of input of swept frequency $\omega_2(t)$ supplied via R.F. amplifier 41 to the location of incidence of beam 45 is greater than the physical distance $\Delta l$ through cell 44 from the point of input of swept frequency $\omega_2(t)$ supplied via R.F. amplifier 42 to the location of incidence of beam 45. Therefore, the frequency of beam 21 lags that of beam 22 by an amount proportional to the acoustic delay time between cells, due to the fact that $\Delta L > \Delta l$. This physical arrangement of the cells thereby creates an optical delay chirp, wherein the frequency of each beam 21 and 22 varies with time; yet there is established a constant frequency difference between the two beams, since acousto-optic cells 43 and 44 are driven by the same sweep signal from oscillator 40.

As in the previously described chirp mode embodiment, shown in FIG. 3, the angular displacements of beams 21 and 22 are converted by lens 32 into positional deflections of point sources 24 and 25. Again, zero order stop plate 33 is provided to remove the optical D.C. bias component. Lens 13 then transforms point sources 24 and 25 into plane waves of changing angles of incidence upon hologram transparency 14 to form a fixed carrier (the frequency difference between beams 21 and 22 is constant) interference pattern 23" thereon, whereby photo-detector 15 generates a fixed carrier-containing hologram reconstruction signal, which may then be processed in accordance with the embodiment illustrated in FIG. 1. Of course, in this delay-chirp mode, the illumination of transparency 14 is to commense only after that portion of each of cells 43 and 44 upon which beam 45 impinges contains a travelling acoustic chirp, so that the initial acoustic delay period will have passed.

In the previously-described time-varying frequency mode embodiment shown in FIG. 3, the frequency of only one of the beams was caused to vary with time to establish a frequency difference between the respective beams 21 and 22 so that the interference pattern formed on the hologram transparency varied with time during the scanning process. In the embodiment of the invention shown in FIG. 4, on the other hand, the frequency of each of the beams 21 and 22 was caused to vary with time, but delayed relative to one another due to the arrangement of acoustic cells 43 and 44, in accordance with the same time-varying input frequency signal.

Figure 5:
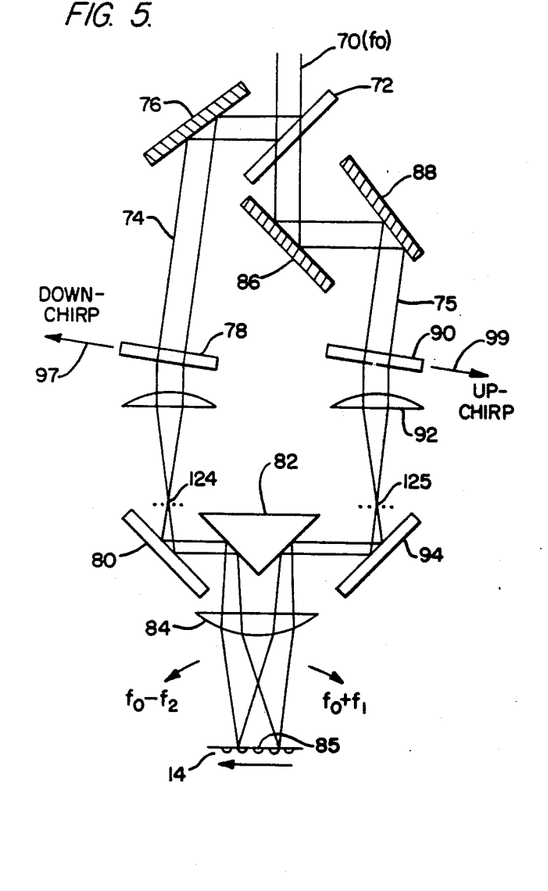
FIGS. 5 and 6 illustrate further respective embodiments of a phase-insensitive hologram read-out system employing chirp scanning.
Figure 6:
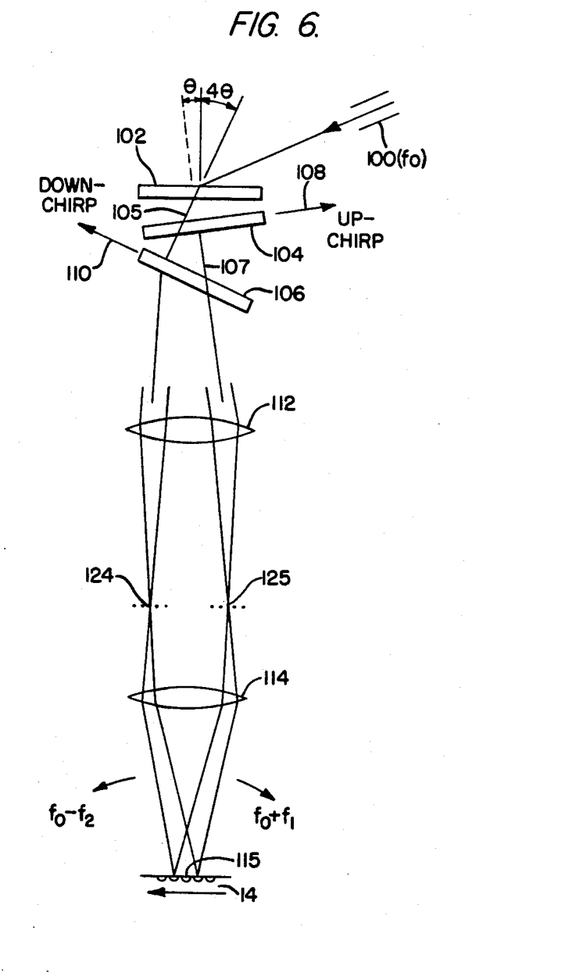

FIGS. 5 and 6 depict further embodiments of the invention, wherein separate time-varying frequency signals are used to carry out the desired Fourier scan of the hologram transparency with the frequency difference between the two beams being maintained at a constant value. In each embodiment, one of the beams to be employed for creating the read-out interference pattern is deflected with a signal the frequency of which increases with time, while the other beam is deflected with a signal the frequency of which decreases with time. Preferably, the rate of increase in frequency of one signal is the same as the rate of decrease in frequency of the other signal so that, although an optical chirp is created in each beam, the frequency difference between the beams will remain constant for all angles of incidence on the hologram transparency, thereby again simplifying the electronic demodulation process to that illustrated in FIG. 1, as in the case of the embodiment of the invention shown in FIG. 4.

Referring now to FIG. 5, there is shown a dual chirp deflection arrangement wherein a single read-out beam 70, of frequency $f_0$, is divided into a pair of read-out beams 74 and 75 by beam splitter 72 and mirrors 76, 86, and 88. Disposed in the path of beam 74 is a first chirp-producing medium, such as a suitable acousto-optic cell 78 which is supplied with a driving frequency signal $f_2(t)$, the frequency of which decreases with time. Disposed in the path of beam 75 is a second chirp-producing medium, again a suitable acousto-optic cell 90 which is driven by a signal $f_1(t)$, the frequency of which increases with time and at a rate equal to that rate of decrease in frequency of signal $f_2(t)$. Due to the Doppler-shifts imparted to beams 74 and 75 by cells 78 and 90, respectively, beams 74 and 75 are converted in frequency to $f_{74} = f_0 - f_2$ and $f_{75} = f_0 + f_1$. Cell 78 angularly deflects frequency-converted beam 74, and this angular deflection is converted by lens 79 into positional displacement of point source 124. Similarly, lens 92 converts the angular displacement of the frequency converted beam 75 into a positionally displaced point source 125. From point sources 124 and 125, the displaced beams reflect off mirrors 80 and 94 and triangular reflector 82 to impinge upon lens 84. Lens 84 converts the positionally displaced beam sources 124 and 125 into angularly deflected beams impinging upon hologram transparency 14 to create interference pattern 85. Although a pair of optical chirp signals are supplied to deflect beams 74 and 75, the carrier frequency component of the read-out intensity interference pattern remains constant since $$\frac{df_1(t)}{dt} = \frac{-df_2(t)}{dt}$$

Figure 8:
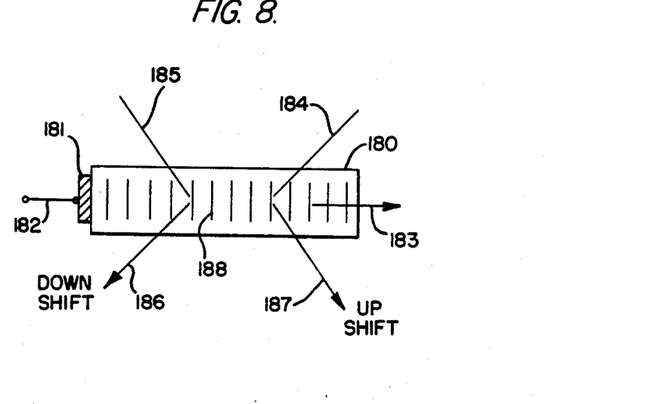
FIG. 8 is an enlarged view of an acousto-optic modulator element and its effective frequency translation effect.

The manner in which up-shift and down-shift beams are produced by an acoustic-optic cell driven by a time varying input frequency signal will be explained with reference to FIG. 8. Shown therein is a typical acousto-optic cell 180 at one end of which there is provided an input transducer for converting electrical input signals applied to lead 182 into acoustic waves 188, such as ultrasonic waves, which travel through cell 180 in the direction of arrow 183. The electrical input signals are assumed to be of the form $\omega(t) = kt + \omega_0$, i.e. the frequency of the input signal, such as a sinusoidal input, varies with time in a linear fashion. Now, letting the frequency of these input signals increase with time, light incident upon cell 180 will be diffracted at successively changing angles to effect a sweeping angular deflection of the incident beam. In addition there is a change in the frequency of the beam due to the Doppler shift imparted by the travelling acoustic waves.

Considering incident beam 184, for example, the beam may be separated into orthogonal components, one of which is normal to the direction of travel 183 of waves 188, and the other of which is parallel to the direction of travel 183. Since the component of beam 184 which is parallel to arrow 183 has a direction opposing that of arrow 183, the Doppler shift imparted by the acoustic wavefront will impart an increase in the frequency of beam 184 so that exitting beam 187 is up-shifted in frequency. On the other hand, the direction of travel of the component of beam 185 which is parallel to the direction of travel of acoustic waves 188 is the same as that indicated by arrow 183, and exitting beam 186, reflected off the acoustic wave upon which beam 185 is incident, will have undergone a decrease in frequency due to the Doppler shift. In FIG. 8, only one cell, 180, is illustrated to explain the operation of the cell relative to the angle of incidence of an incident beam. In the embodiment of the invention shown in FIG. 5, separate cells 78 and 90 are appropriately inclined relative to individual beams 74 and 75, respectively, to create the appropriate down- and up-frequency shifts.

The application of up-chirp (frequency increases with time) and down-chirp (frequency decreases with time) deflection signals to a pair of interference patterns forming read-out beams can also be incorporated in the Fourier scanning system shown in FIG. 6. Shown at 100 is a single input light beam, which is to be separated into a pair of read-out beams, the frequency of each of which is to vary with time, while each is displaced by an appropriate optical deflection medium. Again, for this purpose, a pair of acousto-optic cells 104 and 106 may be provided. Cells 104 and 106 are positioned relative to each other so that both chirped beams traverse each cell, but only one beam is affected by the chirp driving cell applied to a particular cell.

More specifically, a beam splitter 102 is disposed relative to beam 100 to generate a pair of beams 105 and 107. Beam 107 is generated in a direction displaced from the normal to the plane of element 102 by the Bragg angle, while beam 105 is generated by element 102 in a direction four times the Bragg angle, relative to the normal, to element 102. Each of cells 104 and 106 is disposed to be normal to beams 107 and 105, respectively, so that only beam 107 is subjected to the up-chirp signal applied to cell 104, established by an acoustic wave travelling in cell 104 in the direction of arrow 108, while only beam 105 is subjected to the down-chirp signal travelling in cell 106 in the direction of arrow 110. The angular deflections imparted to beams 105 and 107 are converted by lens 112 into positional displacements of point sources 124 and 125. Lens 114, separated from points 124 and 125 and hologram transparency 14 by its focal length $f_{114}$, converts the positional displacements of point sources 124 and 125 into angular displacements for beams 105 and 107 as they form spatially and time varying interference pattern 115. Again, by setting $$\frac{df_2(t)}{dt} = \frac{-df_1(t)}{dt},$$

the difference in frequency of beams 105 and 107 will be constant, as was the case with the dual chirp embodiment shown in FIG. 5 so that demodulation of the photodetector output can be simplified.

By virtue of the time varying spatial and temporal frequency component containing read-out intensity pattern produced in accordance with the present invention, there is obtained a hologram read-out system which enjoys immunity to phase errors, such as wedge errors, fingerprints, phase irregularities, etc. Electronic scaling may be readily accomplished, since film shrinkage can be compensated by a corresponding change in the deflection rate. Also, spatial invariance is maintained; the time of detection is independent of hologram positioning errors, only the carrier frequency shifts a small amount.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In a method of reconstructing information stored in the form of a single hologram, wherein reconstruction energy is directed upon said hologram to thereby form a reconstructed representation of the information stored in said hologram, the improvement comprising the steps of causing said reconstruction energy to form a reconstruction intensity pattern on said hologram, which pattern contains a translating fringe system with a time varying spatial frequency, and integrating the entirety of the information pattern emanating from said hologram onto a single photodetector, so as to retrieve all of the data contained in said single hologram in a time swept fashion.

2. The improvement according to claim 1, wherein said reconstruction energy is formed of a pair of energy beams.

3. The improvement according to claim 2, wherein said energy beams have respectively different frequencies.

4. The improvement according to claim 3, wherein the frequency of at least one of said energy beams varies with time.

5. The improvement according to claim 4, wherein the frequency of each of said energy beams varies with time.

6. The improvement according to claim 5, wherein the difference in the time-varying frequencies of said two energy beams remains constant.

7. The improvement according to claim 1, wherein said reconstruction energy is in the form of electromagnetic waves.

8. The improvement according to claim 1, wherein said reconstruction energy is in the form of light waves.

9. The improvement according to claim 2, wherein said causing step comprises varying the angle of incidence of said energy beams relative to each other as they impinge upon said hologram.

10. The improvement according to claim 9, wherein the frequency of at least one of said energy beams varies with time.

11. The improvement according to claim 1, wherein said hologram is an optical Fourier hologram and said step of causing said reconstruction energy to form a reconstruction intensity pattern comprises the step of positionally displacing a pair of point sources of light relative to each other and forming the Fourier transform of said positionally displaced point sources of light on said hologram.

12. The improvement according to claim 11, wherein said positional displacement step comprises the step of maintaining the position of one of said point sources of light fixed while displacing the other point source of light.

13. The improvement according to claim 11, wherein said positional displacement step comprises positionally displacing each of said point sources of light.

14. The improvement according to claim 13, wherein said point sources of light have respectively different frequencies.

15. The improvement according to claim 14, wherein the frequency of at least one of said two point sources of light varies with time.

16. The improvement according to claim 14, wherein the frequency of each of said two point sources of light varies with time.

17. The improvement according to claim 11, wherein the information stored in said hologram is recorded in the linear portion of the intensity transmittance versus exposure curve of a hologram recording medium.

18. The improvement according to claim 16, wherein the difference in the time varying frequencies of said two point sources of light remains constant.

19. The improvement according to claim 11, further comprising the steps of
generating a signal representative of the integral of the product of the illumination intensity represented by said interference pattern and the intensity transmissivity of said hologram; and
demodulating said signal to thereby obtain said information.

20. In an apparatus for reading out information stored in the form of a single hologram, wherein reconstruction energy is directed upon said hologram to thereby form a reconstructed representation of the information stored in said hologram,
the improvement comprising:
means for causing said reconstruction energy to form a reconstruction intensity pattern on said hologram, which pattern contains a translating fringe system with a time varying spatial frequency; and
a single photodetector positioned to receive the entirety of the information pattern emanating from said hologram, all of the information contained in said pattern being integrated thereby, so as to retrieve all of the data contained in said single hologram in a time swept fashion.

21. The improvement according to claim 20, wherein said reconstruction energy is formed of a pair of energy beams.

22. The improvement according to claim 21, wherein said energy beams have respectively different frequencies.

23. The improvement according to claim 22, wherein the frequency of at least one of said energy beams varies with time.

24. The improvement according to claim 23, wherein the frequency of each of said energy beams varies with time.

25. The improvement according to claim 24, wherein the difference in the time-varying frequencies of said two energy beams remains constant.

26. The improvement according to claim 20, wherein said reconstruction energy is in the form of electromagnetic waves.

27. The improvement according to claim 20, wherein said reconstruction energy is in the form of light waves.

28. The improvement according to claim 20, wherein said hologram is an optical Fourier hologram and said means comprises
first means for generating a pair of point sources of light and for positionally displacing said point sources of light relative to each other; and
second means, disposed in the paths of beams emanating from said relatively displaced point sources of light, for forming the Fourier transforms of said relatively positionally displaced point sources of light on said hologram.

29. The improvement according to claim 28, wherein said first means comprises means for maintaining the position of one of said point sources of light fixed while displacing the other point source of light.

30. The improvement according to claim 28, wherein said first means comprises means for positionally displacing each of said point sources of light.

31. The improvement according to claim 30, wherein said point sources of light have respectively different frequencies.

32. The improvement according to claim 31, wherein said first means includes means for causing the frequency of at least one of said two point sources of light to vary with time.

33. The improvement according to claim 32, wherein said first means includes means for causing the frequency of each of said two point sources of light to vary with time.

34. The improvement according to claim 28, wherein the information stored in said hologram is recorded in the linear portion of the intensity transmittance versus exposure curve of a hologram recording medium.

35. The improvement according to claim 33, wherein said first means comprises means for maintaining the difference in the time-varying frequencies of said two point sources of light constant.

36. The improvement according to claim 28, wherein said single photodetector generates a signal representative of the integral of the product of the illumination intensity represented by said interference pattern and the intensity transmissivity of said hologram, and further comprising
fourth means, coupled to said photodetector, for demodulating said signal to thereby obtain said data.

37. The improvement according to claim 33, wherein said first means includes a pair of acousto-optic deflectors, each of which is driven by a time varying frequency signal, disposed in the path of a source read-out beam, for generating a pair of angularly deflected beams from said source read-out beam, and a first Fourier transform lens system, optically coupled to receive said pair of angularly deflected beams and transforming said angularly deflected beams into said pair of point sources of light positionally displaced relative to each other.

38. The improvement according to claim 37, wherein said acousto-optic deflectors are so disposed in the path of said source read-out beam that the frequency of the acoustic deflection wave transmitted through one of said deflectors at the position of incidence of said source read-out beam thereon is delayed relative to the frequency of the acoustic wave transmitted through the other of said deflectors at the position of incidence of said source read-out beam thereon.

39. The improvement according to claim 37, wherein said second means comprises a second Fourier transform lens, optically coupled to receive the beams emanating from said pair of point sources of light, disposed between said first Fourier transform lens and said hologram.

40. The improvement according to claim 39, further comprising a zero order diffraction stop filter disposed downstream of said first Fourier transform lens.

41. The improvement according to claim 37, wherein the frequency of the signal applied to one of said acousto-optic deflectors increases with time, while the frequency of the signal applied to the other of said acousto-optic deflectors decreases with time.

42. The improvement according to claim 41, wherein the difference in the time varying frequencies of the signals applied to said pair of acousto-optic deflectors is constant.

43. The improvement according to claim 37, further comprising means, disposed in the path of said source read-out beam, for producing therefrom a pair of read-out beams travelling along respectively different optical paths, and wherein said acousto-optic deflectors are so positioned as to have each read-out beam impinge thereon but to cause a deflection of a respectively different one of said beams.

44. The improvement according to claim 32, wherein said first means includes an acoustic-optic deflector driven by a summation signal containing a time varying frequency component and a constant frequency component, disposed in the path of a source read-out beam, for generating a pair of angularly deflected beams from said source read-out beam, and a first Fourier transform lens, optically coupled to receive said pair of angularly deflected beams and transforming said angularly deflected beams into said pair of point sources of light positionally displaced relative to each other.

45. The improvement according to claim 44, wherein said second means comprises a second Fourier transform lens, optically coupled to receive the beams emanating from said pair of point sources of light, disposed between said first Fourier transform lens and said hologram.

46. The improvement according to claim 45, further comprising a zero order diffraction stop filter disposed downstream of said first Fourier transform lens.

47. The improvement according to claim 22, wherein said means comprises means for varying the angle of incidence of said energy beams relative to each other as they impinge upon said hologram.

48. The improvement according to claim 47, wherein said means comprises means for varying the frequency of at least one of said energy beams with time.

49. The improvement according to claim 47, wherein said means comprises means for simultaneously varying said angle of incidence while shifting the frequency of at least one of said energy beams.

50. The improvement according to claim 49, wherein said means comprises a controlled acousto-optic beam deflector.

51. The improvement according to claim 49, wherein said means comprises a controlled electromechanical beam deflector.

* * * * *